Figure 1:
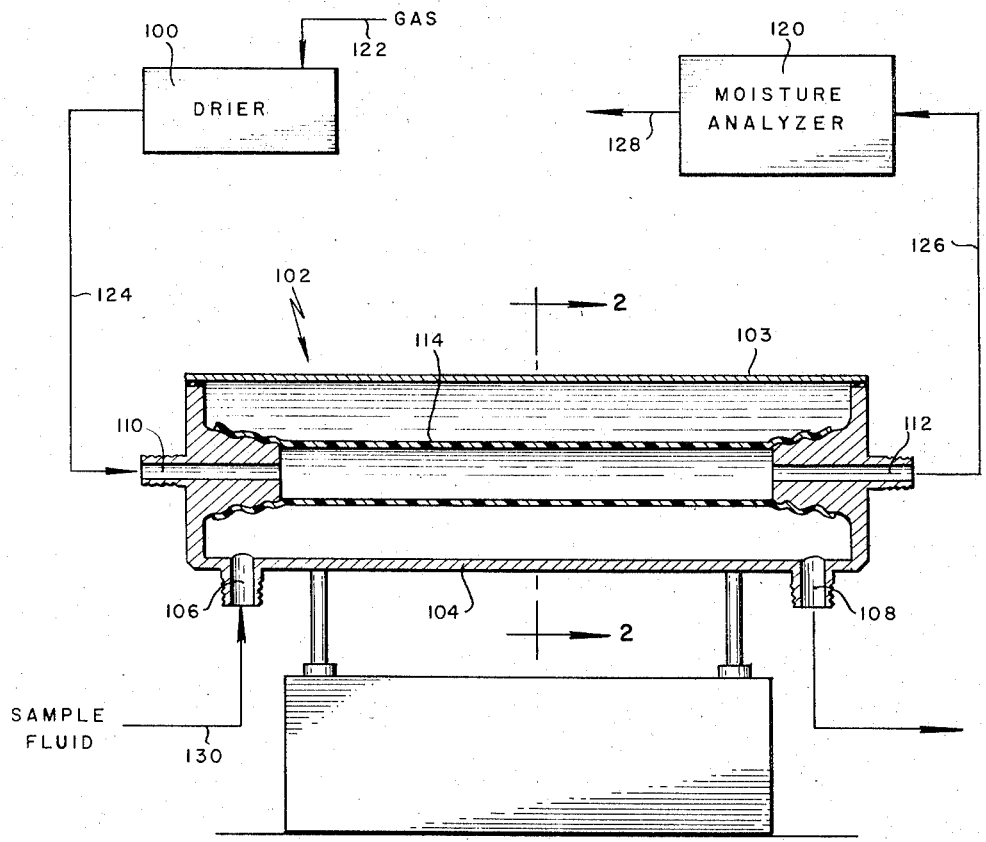

Feb. 6, 1968

L. M. JOHNSON 3,367,850

METHOD AND APPARATUS FOR DETERMINING MOISTURE
CONTENT OF HYDROCARBON FLUIDS

Filed Dec. 7, 1964

INVENTOR.
LEE M. JOHNSON,
BY
*Sylvester W. Brock Jr.*
ATTORNEY.

United States Patent Office 3,367,850
Patented Feb. 6, 1968

3,367,850
METHOD AND APPARATUS FOR DETERMINING MOISTURE CONTENT OF HYDROCARBON FLUIDS
Lee M. Johnson, Austin, Tex., assignor, by mesne assignments, to Esso Research and Engineering Company, Elizabeth, N.J., a corporation of Delaware
Filed Dec. 7, 1964, Ser. No. 416,236
10 Claims. (Cl. 204—1)

The present invention is directed to an improved method for the determination of moisture in hydrocarbon fluids, and an apparatus for carrying out this method. More particularly, the present invention is directed to a method for determining the moisture content in a hydrocarbon fluid by passing a sample hydrocarbon stream in contact with a first surface of semipermeable membrane, and passing a dry gas in contact with a second surface of said semipermeable membrane, whereby moisture in said hydrocarbon stream can dialyze through said semipermeable membrane into the gas stream, and then determining the resulting equilibrium moisture content of the gas stream as a parameter of the moisture content of the sample hydrocarbon stream.

The present invention is particularly useful in combination with an electrolytic moisture analyzer, which employs a gaseous stream as the moisture-bearing fluid, the water content of which is to be determined and which contains a pair of spiral-wound electrodes within a glass sheath, the surface of the glass sheath between the electrodes being covered with a material such as phosphorus pentoxide which is electrically conductive when wet. Thus, as water in the gaseous stream is adsorbed into the phosphorus pentoxide, an electric current can flow which then breaks the water into elemental constituents, hydrogen and oxygen. The amount of electrical energy consumed is an indication of the moisture content of the flowing stream.

This type of analysis has been employed heretofore in determining the moisture content of gases and vapors, and also in determining the moisture content of a flowing stream of hydrocarbon fluid. The technique heretofore employed in determining the moisture content of a flowing hydrocarbon fluid has involved transferring the moisture into the gas phase in a small stripping column, and the gas is then transmitted to the electrolytic analyzer. Plant experience with instruments using this technique has been unfavorable since the instruments have been generally unreliable. The major difficulties experienced in plant use have been contamination of the electrolytic cell by hydrocarbon liquids which have been carried into the vapor phase along with the moisture and mechanical problems associated with the injection of a small quantity of metered liquid (1 ml./min. or less) into the stripping column.

These problems are avoided by the present invention wherein a hydrocarbon sample stream is passed in contact with a first surface of a semipermeable membrane facing a first zone while a dry gas flows in contact with the opposite surface of the semipermeable membrane facing a second zone. By using predetermined flow rates of the dry gas and hydrocarbon sample stream, a determination of the moisture content of the hydrocarbon stream can be obtained as a parameter of the directly measured moisture content of the dry gas stream (after it has picked up the moisture which dialyzes through the semipermeable membrane). The moisture analyzer can be calibrated, at a given temperature, to read directly the moisture content of the hydrocarbon sample stream.

The dry gas can be $CO_2$, $CH_4$, nitrogen, helium, etc., preferably nitrogen.

Figure 2:
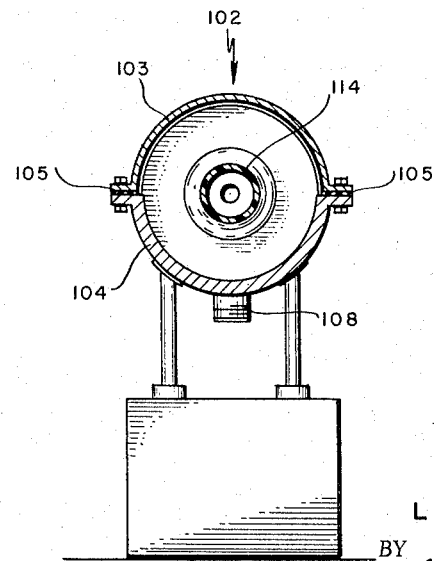

The present invention can be more clearly understood by reference to the drawings in which:
FIG. 1 is a sectional elevation view of an exemplary apparatus involving the present invention, and
FIG. 2 is a section of FIG. 1 taken, as indicated, by the arrows 2—2.

Referring now to FIG. 1, the present invention is seen to involve in combination a gas drier 100 (containing calcium chloride or silica gel, for example, a water-transfer device 102 comprising a shell 104 having a liquid inlet 106 and a liquid outlet 108, a gas inlet 110, and a gas outlet 112, a tubular, semipermeable membrane 114 which extends within the shell from the gas inlet to the gas outlet and defines a gas passageway therebetween, and a moisture analyzer 120 which may be an electrolytic moisture analyzer such as that described by Keidel in Analytical Chemistry, vol. XXXI, No. 12, December 1959, pages 2043 to 2048.

Conduit means are provide at 122 for introducing a carrier gas into the drier 100, at 124 for passing the dried gas into the gas inlet of the water-transfer device, at 126 for transferring the moisture-laden carrier gas into the moisture analyzer, and at 128 for removing the gas from the analyzer.

Conduit means 130 is provided for passing a stream of hydrocarbon sample fluid through the shell of the water-transfer device in contact with the outer surface of the semipermeable membrane 114.

In FIG. 1, the semipermeable membrane is shown in its preferred embodiment; that is, a tubular semipermeable membrane. The membrane may be a polyvinyl chloride tubing having a wall thickness of about 0.01 to 5 inches, and may extend for a length of about 3 feet. Other materials which are suitable are well-known semipermeable membranes, as well as cellophane (cellulose acetate), Teflon, tracing cloth, etc. Generally, the wall thickness of the semipermeable membrane will range from 0.001 to 0.02 inch.

Temperature has an effect on the moisture analyzer, and, thus, it is preferred that the device be operated at a relatively constant temperature. The temperature may range anywhere from 40° F. to 150° F. (depending on membrane strength at the various temperatures), but during the determination of moisture, the temperature should not vary more than 5° F.

Referring now to FIG. 2, a cross-section of the water-transfer device is shown which contains the semipermeable membrane 114 within the shell 104 and illustrates that the shell 104 may be constructed so as to have a removable portion 103 which is held in place by bolts or screws (not shown) passing through the flanges 105. Suitable gasket or sealing material can be placed, of course, around the periphery of the portion 103 in order to maintain the fluid-tight character of the moisture-transfer device.

Data have been obtained in operating a device constructed in accordance with the present invention and operated in accordance with the method herein set forth. Trial runs were made using a polyvinyl chloride tubing approximately three feet long, 0.1 inch in diameter, and 0.015 inch thick. The membrane was contained within a three-eights inch inside diameter steel tubing. The sample hydrocarbon stream was pumped through the annulus formed by the membrane and the steel tubing, while a nitrogen carrier gas was passed through the tubing. The flow rate of the carrier gas was 100 cc./min.; the flow rate of the hydrocarbon sample fluid was about 300 cc./min., with 15 p.s.i.g. on each side of the membrane. The system provided a signal sensitivity several times greater than the minimum necessary for the maximum sensitivity required (0.10 p.p.m. $H_2O$).

It is to be understood that the present invention should not be limited to the specific embodiment herein stated. It will be apparent to those skilled in the art that numerous departures from the physical embodiment can be made while still employing the same invention. For example, a flat membrane may be suspended within a passageway, dividing that passageway into two portions, the gaseous strain being passed on one side and the hydrocarbon sample stream being passed on the other.

Having disclosed the essence of the present invention, what is to be covered by Letters Patent should be limited not by the specific embodiment herein given, but rather by the appended claims.

I claim:

1. In combination:
   a gas drier,
   a semipermeable membrane permeable to moisture having a first surface facing a first zone and a second surface facing a second zone, said membrane isolating said first zone from said second zone, and
   a moisture analyzer,
   means for passing a carrier gas through said gas drier, said first zone, and into said moisture analyzer, and
   means for passing a sample hydrocarbon stream through said second zone,
   whereby water in said sample hydrocarbon stream is passed through said semipermeable membrane into said carrier gas for analysis in said moisture analyzer.

2. Apparatus in accordance with claim 1 wherein the semipermeable membrane is made of polyvinyl chloride.

3. Apparatus in accordance with claim 1 wherein the semipermeable membrane is a polyvinyl chloride tube having a wall thickness of about 0.015 inch.

4. In combination:
   a gas drier,
   a water transfer device comprising a shell having a liquid inlet and a liquid outlet, and having a gas inlet and a gas outlet,
   a tubular semipermeable membrane permeable to moisture extending within said shell from said gas inlet to said gas outlet and defining a gas passageway therebetween,
   and a moisture analyzer,
   conduit means for passing a carrier gas stream sequentially through said gas drier, said gas passageway, and said moisture analyzer,
   and means for admitting a sample hydrocarbon stream into said liquid inlet of said shell.

5. Apparatus in accordance with claim 4 wherein the semipermeable membrane is made of polyvinyl chloride.

6. Apparatus in accordance with claim 4 wherein the semipermeable membrane is a polyvinyl chloride tube having a wall thickness of about 0.015 inch.

7. Apparatus in accordance with claim 6 wherein the polyvinyl chloride tube is about 3 feet long and has a wall thickness of about 0.1 inch.

8. Apparatus in accordance with claim 7 wherein the moisture analyzer is an electrolytic analyzer.

9. A method of determining the moisture content of a hydrocarbon stream which comprises:
   passing a sample hydrocarbon stream at a predetermined volume flow rate in contact with a first surface of a semipermeable membrane permeable to moisture,
   passing a dry gas stream at a predetermined volume flow rate in contact with the opposite surface of said semipermeable membrane in isolation from said sample stream,
   whereby all moisture in said sample hydrocarbon stream is dialyzed through said semipermeable membrane from said hydrocarbon stream into said gas stream,
   and passing the gas stream containing moisture to a moisture analyzer to determine the moisture content of the gas stream and thereby the moisture content of the sample stream.

10. A method in accordance with claim 9 wherein the moisture content of the gas stream is determined by electrolytically decomposing the water in the gas and measuring the consumed electricity.

References Cited

UNITED STATES PATENTS

| 2,968,308 | 1/1961 | Lupfer et al. | 210—23 |
| 2,981,680 | 4/1961 | Binning | 55—16 |
| 3,035,060 | 5/1962 | Binning et al. | 208—187 |
| 3,046,098 | 7/1962 | Brasseur et al. | 23—232 |

FOREIGN PATENTS

| 905,101 | 9/1962 | Great Britain. |

OTHER REFERENCES

Keidel: "Analytical Chemistry," vol. 31, No. 12, December 1959, pp. 2043-2048.

HOWARD S. WILLIAMS, *Primary Examiner.*

T. H. TUNG, *Assistant Examiner.*